United States Patent
Basic et al.

(10) Patent No.: US 9,450,479 B2
(45) Date of Patent: Sep. 20, 2016

(54) SYSTEMS AND METHODS TO OPTIMIZE ACTIVE CURRENT SHARING OF PARALLEL POWER CONVERTERS

(71) Applicant: GE Energy Power Conversion Technology Ltd, Warwickshire (GB)

(72) Inventors: Duro Basic, Garching b. Munchen (DE); Mathieu Giroux, Garching b. Munchen (DE)

(73) Assignee: GE ENERGY POWER CONVERSION TECHNOLOGY LTD, Rugby, Warwickshire (GB)

( * ) Notice: Subject to any disclaimer, the term of this patent is extended or adjusted under 35 U.S.C. 154(b) by 0 days.

(21) Appl. No.: 14/627,041

(22) Filed: Feb. 20, 2015

(65) Prior Publication Data

US 2016/0248315 A1    Aug. 25, 2016

(51) Int. Cl.
- H02M 1/12 (2006.01)
- H02M 1/14 (2006.01)
- H02M 7/5387 (2007.01)
- H02M 7/539 (2006.01)

(52) U.S. Cl.
CPC ............... H02M 1/12 (2013.01); H02M 7/539 (2013.01)

(58) Field of Classification Search
CPC .......... H02M 1/12; H02M 2001/123; H02M 1/126; H02M 1/143; H02M 7/53871
See application file for complete search history.

(56) References Cited

U.S. PATENT DOCUMENTS

| | | | |
|---|---|---|---|
| 3,753,002 A | 8/1973 | Jacobson et al. | |
| 5,257,180 A | 10/1993 | Sashida et al. | |
| 5,436,823 A | 7/1995 | Araki | |
| 6,452,290 B1 | 9/2002 | Yoshioka et al. | |
| 6,751,106 B2* | 6/2004 | Zhang | H02M 5/45 363/71 |
| 7,425,779 B2 | 9/2008 | Luo et al. | |
| 7,602,627 B2 | 10/2009 | Ohshima et al. | |
| 7,852,643 B2 | 12/2010 | Zhang et al. | |
| 2004/0032755 A1 | 2/2004 | Pollanen et al. | |
| 2009/0003020 A1* | 1/2009 | Zhang | H02M 5/4585 363/65 |

(Continued)

FOREIGN PATENT DOCUMENTS

| | | |
|---|---|---|
| EP | 0492396 A1 | 7/1992 |
| JP | 2006174679 A | 6/2006 |
| JP | 2008199874 A | 8/2008 |

OTHER PUBLICATIONS

Bin Shi et al., "Parallel Operation of Voltage Source Inverters With Minimal Intermodule Reactors", Date: Oct. 3-7, 2004, vol. 1, ISSN : 0197-2618.

(Continued)

Primary Examiner — Timothy J Dole
Assistant Examiner — Sisay G Tiku
(74) Attorney, Agent, or Firm — GE Global Patent Operation; Catherine J. Toppin

(57) ABSTRACT

Provided is an approach for active control of cross currents flowing among multiple paralleled converters. Control of cross currents is achieved by using at least one proportional-integral (PI) controller and at least one resonant controller to target several selected dominant harmonics with infinite gains to ensure elimination of targeted harmonic cross currents in steady state. The cross currents are decomposed by into (1) common mode and differential mode components or (2) current phase domain components and each component is suppressed to a value approximately near zero using the controller. Also provided is a device comprises instructions, that, when executed by a processor, cause the processor to perform operations, which regulate and suppress cross current within a power system.

16 Claims, 4 Drawing Sheets

(56) References Cited

U.S. PATENT DOCUMENTS

2012/0170333 A1* 7/2012 Bando ............... H02M 7/5395
363/56.01
2014/0078796 A1* 3/2014 Inoue ..................... H02M 5/10
363/68

OTHER PUBLICATIONS

Cha et al., "Design and control of Proportional-Resonant controller based Photovoltaic power conditioning system", 2009 IEEE Energy Conversion Congress and Exposition, pp. 2198-2205, Sep. 20, 2009.

Manoloiu et al., "Comparison of PI and PR current controllers applied on two-level VSC-HVDC transmission system", 2015 IEEE Eindhoven PowerTech, pp. 01-05, Jun. 1, 2015.

European Search Report and Written Opinion issued in connection with corresponding EP Application No. 16156429.9 on Jul. 22, 2016.

* cited by examiner

SYSTEMS AND METHODS TO OPTIMIZE ACTIVE CURRENT SHARING OF PARALLEL POWER CONVERTERS

FIELD OF INVENTION

The present invention relates generally to parallel operation of multiple three-phase voltage source power converters. More specifically, the present invention relates to an optimized current controller suitable for active control of current sharing among power converters connected in parallel.

BACKGROUND OF THE INVENTION

Voltage source pulse width modulated (PWM) power converters are used in many power conversion applications such as variable speed drives, wind and solar converters, power supplies, uninterrupted power system (UPS), power quality systems, among others.

Power systems employing parallel topologies are able to de-correlate the relationship between switching frequency and power capacity, thus avoiding performance constraints associated with single high power device characteristics.

Cross-currents developed within the paralleled power converters do not contribute to power transfer and can reduce the overall converter system efficiency. Additionally, since cross-currents can cause overloads of individual converters, cross-current flow can be reduced by using passive and active means.

Paralleling of the converters via direct connections of the converter outputs with no inductors used between the converters is known as hard paralleling. In hard paralleling, voltage errors, which initiate cross currents, are mainly caused by different semiconductor switch parameters and gate drivers characteristics, which can lead to switching not being performed synchronously on all converters. Due to the need for synchronous converter switching to limit cross-current flow in direct hard parallel power converters, semiconductor devices with closely matched characteristics can be used.

Alternatively, inductors can be introduced in series with converter terminals before paralleling (soft paralleling). Instantaneous cross currents, caused by non-synchronous pulse width modulation (PWM) switching, can be limited by selecting a proper inductance value. If converter switching instances are only marginally desynchronized (e.g., due to control or tolerances in the drivers and turn-on and turn-off times of the switches), the inductance used for paralleling can be very small (e.g., fraction of 1%).

Current sharing control can be achieved via local converter current control loops to ensure converter currents are equal. Alternatively, a global current controller can be used to control cumulative currents.

Each converter may use local cross current controllers to enforce sharing of currents by trimming the base voltage reference (set by the cumulative current controller). One example is to use local current loops with proportional gain (P) to electronically emulate additional internal resistance by the converter to increase effective impedance seen by the cross currents. However, using local current control loops does not take into account that, due to various current paths, inductances seen by the cumulative and cross currents are not same. The converter currents can contain differential mode and common mode (zero sequence) cross current components. In situations when the inductors are magnetically coupled, the common mode inductance ($L_0$ seen by the common mode cross currents) and differential mode inductances (L, seen by the differential mode cross currents) may differ significantly.

Additionally, a limit exists on the P controller gain (emulated impedance), which cannot be set arbitrary high due to stability constraints. An upper limit may be approximately near one-fourth (¼) to one-half (½) of deadbeat gain L/Ts, where L is inductance and Ts is sampling period. Thus, permissible controller gains and hence error in the current control is strongly dependent on inductance the inductor used for paralleling.

Attempts have been made to improve reduction of the circulating of cross currents including incorporating integral (I) controller (i.e. with infinite gain). For example, a proportional integral (PI) controller and a synchronous reference frame (SRF) PI controller are introduced into the cross current control system (e.g., to allow for infinite gains localized around dc and positive sequence fundamental frequency). With introduction these integral controllers the cross currents at dc and positive sequence fundamental frequency can be fully suppressed to zero.

However, with this approach the negative sequence fundamental frequency and higher order harmonic cross current components can be only partially attenuated and may remain high in situations when the inductance in the cross current path is low. For example, the third harmonic in the cross current (which see only very small common mode inductance) could exceed the fundamental frequency component and would be only partly suppressed by such conventional controllers.

SUMMARY OF EMBODIMENTS OF THE INVENTION

Given the aforementioned deficiencies of hard paralleling and soft paralleling, a need exists for systems and methods that allow the implement active current sharing control of cross currents. The desired system and methods would include a controller to enable control of specific cross-current components to a value at or near zero.

Performance of the active sharing control can be greatly improved at targeted harmonic frequencies by using selective controllers. By employing a bank of several selective controllers, we can target several dominant spectral components in the cross currents and fully suppress them in steady sate. In this way, the steady state performance of the cross current control loop can be greatly enhanced even in situations when the converters are paralleled via low inductance. Such a selective sharing controller is the main subject of this innovation.

Within the embodiments, a bank of resonant controllers is introduced into the cross current system to ensure zero steady state control errors at central frequencies rather than a PI and positive and negative sequence SRF PI fundamental frequency controllers seen in prior art, thus fully suppressing the cross currents at any arbitrary number of harmonics which are present in the cross currents.

To achieve optimal current control performance, the current controller gains should be scaled accordingly by the inductance seen by the current component. Thus it is advantageous to design the converter current control (instead of composite converter phase currents) to control distinctive current components such as a cumulative cross current, differential mode cross current components, and common mode cross current component. As such, the maximum current controller gain can be optimized rather than restricted by the lowest inductance among the alternative currents paths.

In systems with active control of cross currents, the converters can modify local output voltage references to control the cross-current flow. In such situations, the passive sharing mechanisms are then of secondary importance for the control of the low frequency cross currents. The inductance used for paralleling is often designed only for limiting the high frequency cross current components. The low frequency cross currents are mainly controlled by the active control in a closed loop fashion.

In systems with large power converters operating at low switching frequencies active cross current control based on simple PI controller may have relatively low bandwidth to provide satisfactory level of suppression of the cross currents. This is particularly the case when lower values of the paralleling inductances are used. Performance of the active sharing control can be improved at targeted harmonic frequencies by using selective controllers. By employing a bank of several selective controllers, dominant spectral components can be targeted in the circulating currents and fully suppress the harmonics in steady sate. In this way, the steady state performance of the cross current control loop can be greatly enhanced even in situations when the converters are paralleled via low inductance. Such a selective sharing controller is the main subject of this innovation.

One aspect of this innovation is an approach for active control of cross currents flowing among multiple paralleled converters. Control of cross currents is achieved by using at least one proportional-integral (PI) controller and at least one resonant controller to target several selected dominant harmonics with infinite gains to ensure elimination of targeted harmonic cross currents in steady state.

In some embodiments, the at least one resonant controller adjusts a common mode component or a differential mode component of the cross current within each converter. The common mode and differential mode cross currents are calculated within each converter from the local converter phase current feedbacks and total cumulative current information. The common mode component and/or the differential mode components are suppressed to a value approximately near zero using the controller.

In some embodiments, the at least one resonant controller adjusts the cross current within each converter. The first tread, second tread, and $N^{th}$ tread cross currents are calculated within each converter from the local converter phase current feedbacks and total cumulative current information. In each tread, the first phase, the second phase, and/or the third phase mode cross currents are suppressed to a value approximately near zero using the controller.

Another aspect of the innovation includes an approach to prevent winding-up of multiple resonators and integrators of the selective controller when voltage limitation is reached in a feedback manner.

In some embodiments, the controller executes instructions comprising (i) deriving an initial voltage reference from one of the plurality of converters, (ii) performing a voltage limitation determined by a calculation of voltage not delivered by the converter system due to saturation, (iii) calculating a loss of current corresponding to the calculation of voltage not delivered by the converter system due to saturation, (iv) adjusting the existing amount of cross current by the amount of the of the loss of current, and in some embodiments, (v) adding, to the initial voltage reference, a deliverable voltage reference derived from a cross current to the initial voltage reference.

Another aspect of this innovation is a device for active control of cross currents flowing among multiple paralleled converters. The device comprises instructions, that, when executed by a processor, cause the processor to perform operations, regulating cross current within a paralleled converter system, comprising (i) calculating an existing amount of cross current within each of a plurality of converters within the power converter system, (ii) summing the existing amount of cross current within each of a plurality of converters to identify a common mode component of the cross current, a first differential mode component of the cross current, and a second differential mode component of the cross current, creating a summed cross current, and (iii) applying a selective current control within the plurality of converters to suppress the common mode component of the cross current, the first differential mode current of the cross current, and the second differential mode current of the cross current within the summed crossed current.

In some embodiments, the selective current control executes instructions comprising (i) calculating, within one of the plurality of converters, the common mode component of the summed cross current formed by summing a first current from a first phase of a converter, a second current from a second phase of the converter, and a third current from a third phase of the converter, and (ii) suppressing the common mode component within each of a plurality of dominant harmonics within the one of the plurality of converters is suppressed to a value approximately near zero using the controller.

In some embodiments, the selective current control executes instructions comprising (i) calculating the first differential component of the summed cross current formed by extraction of the common mode component from the summed cross current, and (ii) suppressing the first differential component within each of a plurality of dominant harmonics within the one of the plurality of converters is suppressed to a value approximately near zero using the controller.

In some embodiments, the selective current control executes instructions comprising (i) calculating the second differential component of the summed cross current formed by extraction of the common mode component from the summed cross current, and (ii) suppressing the second differential component within each of a plurality of dominant harmonics within the one of the plurality of converters is suppressed to a value approximately near zero using the controller.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the relevant art(s) to make and use the invention.

DETAILED DESCRIPTION OF THE EMBODIMENTS

While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either, any, several, or all of the listed items.

The use of "including," "comprising," or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. The terms "circuit," "circuitry," and "controller" may include either a single component or a plurality of components, which are either active and/or passive components and may be optionally connected or otherwise coupled together to provide the described function.

Figure 1:
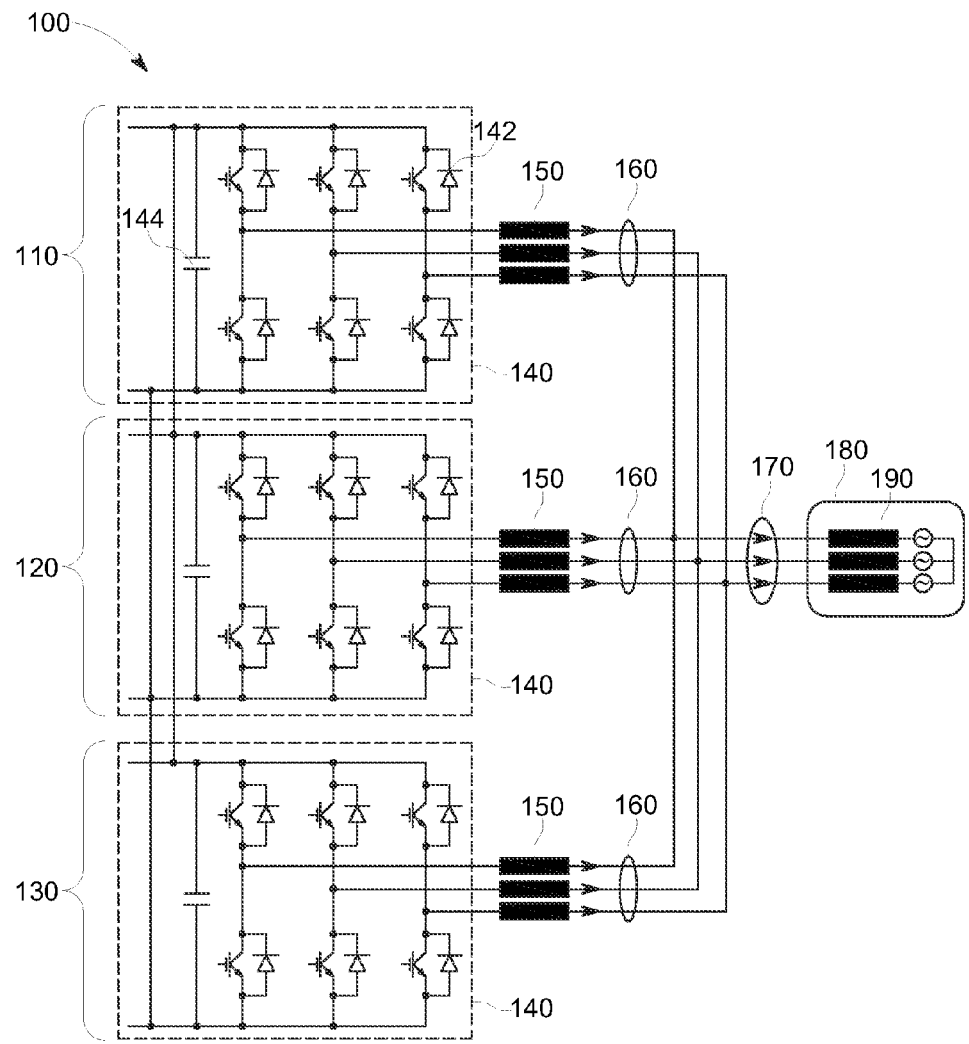
FIG. 1 is a schematic illustrating an exemplary application for an inverter power system with parallel connections converters.

FIG. 1 is a schematic illustrating an inverter power system 100 including parallel converters in a first tread 110, a second tread 120, and an $N^{th}$ tread 130. Each tread 110, 120, 130 includes a converter 140, including an energy storage 144 (e.g., capacitor) and multiple semiconductors 142, paralleled via inductors 150 with a differential inductance parameter and a common mode inductance parameter.

In high power applications, the converters 140 can be paralleled in order to increase current/power rating. As such, the converters 140 can be two-level or multi-level topology, such as but not limited to, PWM.

When paralleling the converters 140, power transferred between the converters 140 and a load should be equally shared between the converters 140. Specifically, a current output 160 of each converter 140 combines a cumulative current 170, which should be shared among the converters 140 within each of the treads 110, 120, 130. Equal sharing the cumulative current 170 among converters 140 minimize cross currents flowing between the converters 140.

The inductors 150 can be introduced in series with terminals of the converters 140 prior to paralleling to limit cross currents caused by non-synchronous switching in different treads 110, 120, 130. For example, if the semiconductors 142 in the treads 110, 120, 130 are only marginally desynchronized, e.g., due to control or tolerances in the drivers and turn-on and turn-off times of the semiconductors 142, the inductance used for paralleling can be minimal, e.g., fraction of 1%. However, if the switching of the converters in the treads 110, 120, 130 are interleaved, the paralleling inductors 150 may require a larger value, e.g., 10-40%.

As state above, the current outputs 160, can be modified to control cross currents within the converter 140 using active current sharing control.

Active current sharing control, designed to control low frequency cross current, can be greatly enhanced at a number of targeted harmonic frequencies by using selective current sharing control.

Figure 2:
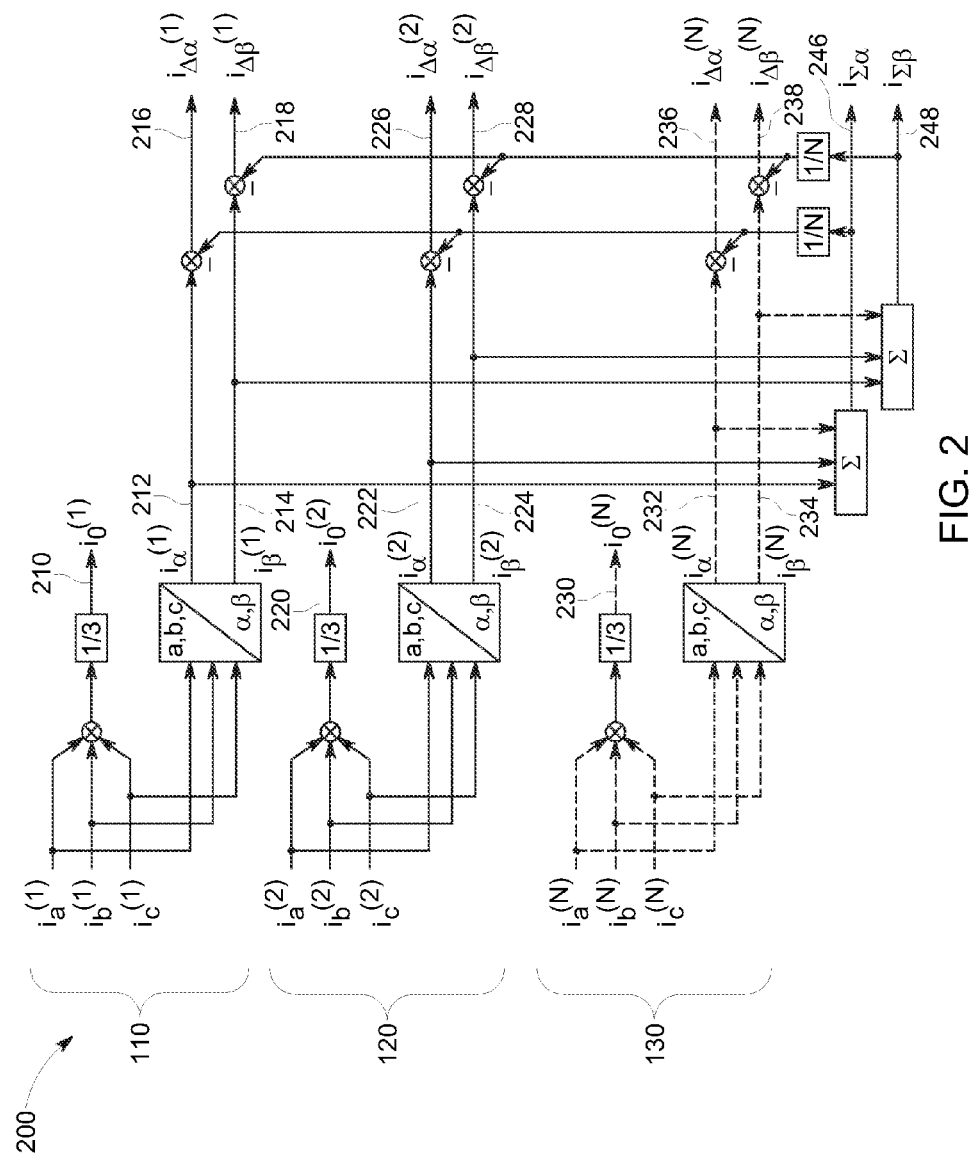
FIG. 2 is a schematic illustrating an exemplary sequence for calculation of a cross current the system of FIG. 1.
Figure 3:
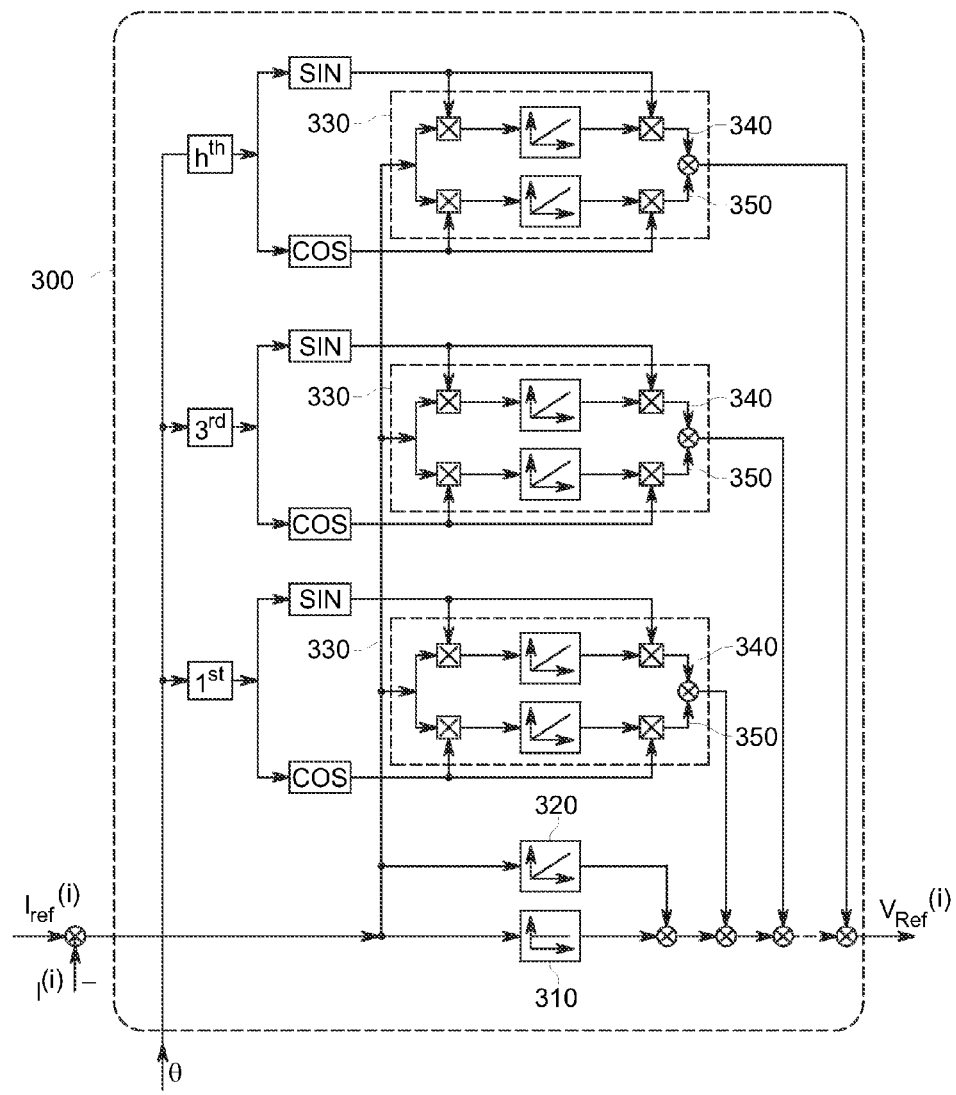
FIG. 3 is a schematic illustrating a sequence within a controller to execute suppression a cross current within the inverter system of FIG. 1.
Figure 4:
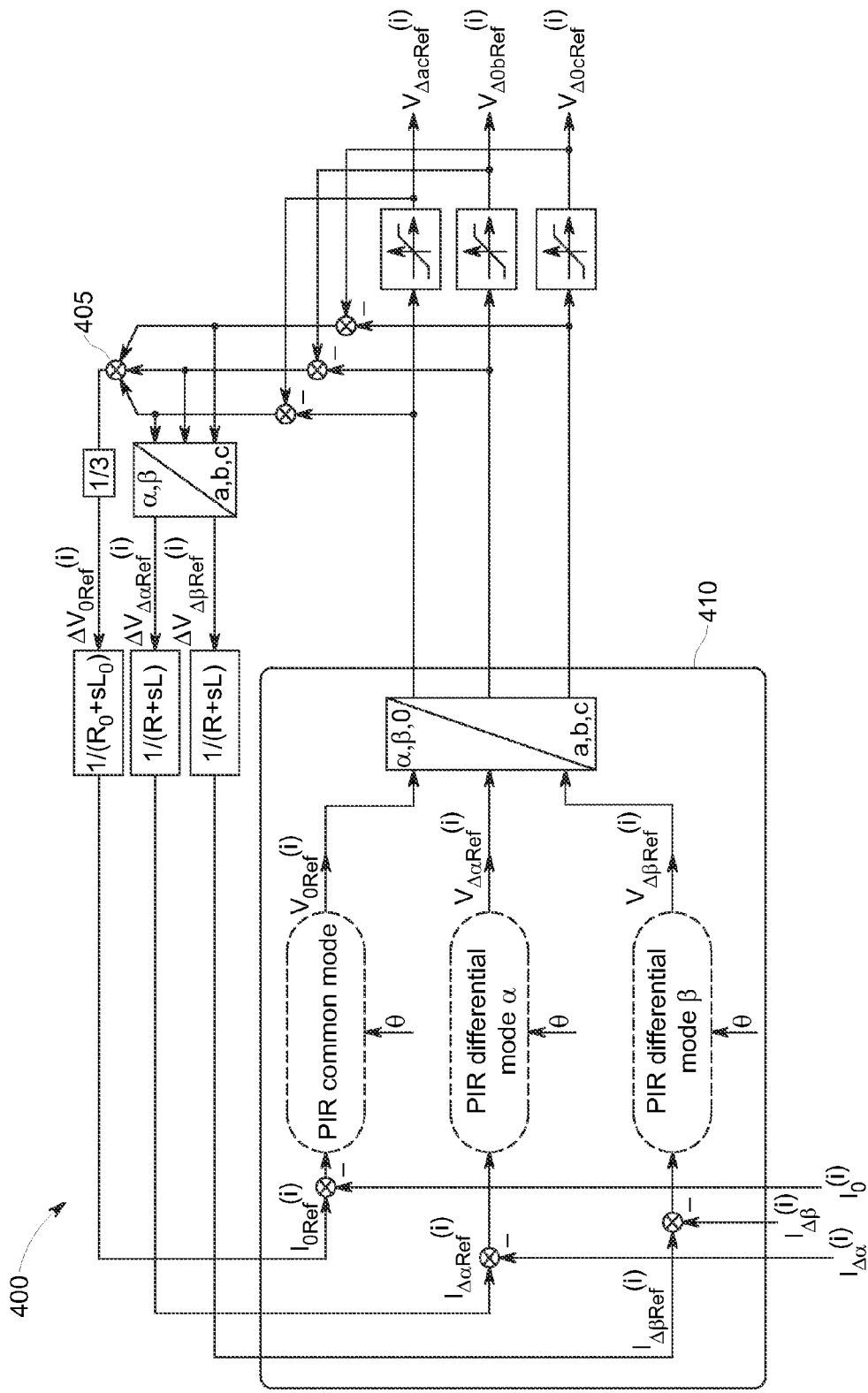
FIG. 4 is a schematic illustrating a sequence within a controller to control cross current using the selective controllers with anti-winding up loops.

The selective active sharing current control includes (i) acquiring current measurements (FIG. 1), (ii) determining the current error (FIG. 2), and (iii) applying a selective current control (FIG. 3). Additionally, where an integrator is present within the control loop, the process may perform (iv) calculation of a voltage limitation with the controller anti-winding up protection (FIG. 4).

First, acquiring the current measurements of the power system 100 requires determining the value of the cumulative current 170, defined as the sum of the output current 160 from each tread 110, 120, and 130. Specifically, the cumulative current 170, $i_{cum}$, is defined as $$i_{cum} = i_1 + i_2 + \ldots + i_N,$$

where N represents the number of phases within the power system 100.

Next, the current error of the power system 100 are determined. To detect current error signals, unwanted cross currents ($i_{cross}$) are used because cross currents directly represent the error signals ($i_{error}$) within the power system 100, specifically, $i_{error} = i_{cross}$. The error signals, and thus the cross current, can be calculated from feedback in phase currents of each converter 140.

FIG. 2 is an exemplary sequence for calculation of a cross current (error current) of the power system 100.

As an example error sequence 200, the power output of each converter 140 can be separated into phase domains, $i_a^{(i)}$, $i_b^{(i)}$, $i_c^{(i)}$, of the $i^{th}$ converter 140, where i=1, 2, . . . , N. Each phase current $i_{a(i)}$, $i_b^{(i)}$, $i_c^{(i)}$ contains a common mode current component ($i_0^{(i)}$) and differential mode current components ($i^{(i)}$, $i^{(i)}$). The sequence calculation of the current component current component ($i_{0(i)}$) and differential mode current components ($i^{(i)}$, $i^{(i)}$) can be seen illustrated in FIG. 2.

As seen in FIG. 2, the common mode current $i_0$ of the $i^{th}$ converter 140 is defined as:

$$i_0^{(i)} = \tfrac{1}{3}(i_a^{(i)} + i_b^{(i)} + i_c^{(i)}),$$

which represents the common mode error signal, and thus the cross current, for the $i^{th}$ converter 140. Specifically, $i_0^{(1)}$ is represented by reference number 210, $i_0^{(2)}$ is represented by reference number 220, and, $i_0^{(N)}$ is represented by reference number 230.

The differential mode current components, $i^{(i)}$ and $i^{(i)}$ for each tread 110, 120, and 130 are defined as:

$$\begin{bmatrix} i_\alpha^{(i)} \\ i_\beta^{(i)} \end{bmatrix} = \frac{2}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_a^{(i)} \\ i_b^{(i)} \\ i_c^{(i)} \end{bmatrix},$$

Where reference numbers 212, 214 respectively represent $i^{(1)}$ and $i^{(1)}$; reference numbers 222, 224 respectively represent $i^{(2)}$ and $i^{(2)}$; and reference numbers 232, 234 respectively represent $i^{(N)}$ and $i^{(N)}$.

The sum of the differential mode currents of all N converters 140 provides cumulative mode currents, which are involved in the power exchange between the converters 140 and a grid 180/plant 190. The cumulative mode currents α and β, shown as reference numbers 246 and 248, respectively, are defined as:

$$i_{\Sigma\alpha} = \sum_{i=1...N} i_\alpha^{(i)},$$

and $$i_{\Sigma\beta} = \sum_{i=1...N} i_\beta^{(i)}.$$

Subtracting the differential mode currents ($i_{diff}$) of each converter 140 from an average value ($i_{avg}$) of all differential modes from each converter 140 provides differential mode cross currents.

$$i_{\Delta\alpha}^{(i)} = i_\alpha^{(i)} - \frac{i_{\Sigma\alpha}}{N}$$

$$i_{\Delta\beta}^{(i)} = i_\beta^{(i)} - \frac{i_{\Sigma\beta}}{N}$$

Referring to FIG. 2, reference numbers 216, 218 respectively represent $i_A^{(1)}$ and $i_A^{(1)}$ at tread 110; reference numbers 226, 228 respectively represent $i_A^{(2)}$ and $i_A^{(2)}$ at tread 120; and reference numbers 236, 238 respectively represent $i_A^{(N)}$ and $i_A^{(N)}$ at tread 130.

It is contemplated that decomposition of each phase current into the common mode current component ($i_0^{(i)}$) and the differential mode current components ($i^{(i)}$, $i^{(i)}$) illustrates an example of optimized realization (e.g., where the inductor 150 responds with an inductance different from the common mode component and differential current component) and is not a pre-request for using current sharing control.

Alternatively, cross current can be derived in the phase domain ($i_a^{(i)}$, $i_b^{(i)}$, $i_c^{(i)}$). For each phase domain ($i_a^{(i)}$, $i_b^{(i)}$, $i_c^{(i)}$), the corresponding phase cross current can be calculated as contains composite differential and common mode cross currents. Specifically, the current of each phase domain is defined as:

$$i_{\Delta0a}^{(i)} = i_a^{(i)} - \frac{i_{\Sigma a}}{N},$$

$$i_{\Delta0b}^{(i)} = i_b^{(i)} - \frac{i_{\Sigma b}}{N}, \text{ and}$$

$$i_{\Delta0c}^{(i)} = i_c^{(i)} - \frac{i_{\Sigma c}}{N}.$$

In embodiments when where the inductor 150 is created by single phase inductors with no magnetic coupling between phases (e.g., responds with same inductance to the common mode component and differential current components), the calculated cross currents $i_{\Delta0a}^{(i)}$, $i_{\Delta0b}^{(i)}$, $i_{\Delta0c}^{(i)}$ can be directly used as inputs to the cross current controller. In these embodiments, there is not an additional benefit in decomposing the circulating current components into the common mode and differential mode components.

The common mode cross current ($i_0^{(i)}$) can then be separated from the differential mode cross currents ($i_{\Delta a}^{(i)}$, $i_{\Delta b}^{(i)}$, $i_{\Delta c}^{(i)}$):

$$i_{\Delta a}^{(i)} = i_{\Delta0a}^{(i)} - i_0^{(i)},$$

$$i_{\Delta b}^{(i)} = i_{\Delta0b}^{(i)} - i_0^{(i)}, \text{ and}$$

$$i_{\Delta c}^{(i)} = i_{\Delta0c}^{(i)} - i_0^{(i)} = -(i_{\Delta a}^{(i)} + i_{\Delta b}^{(i)}).$$

Finally, once the cross currents (error currents) are identified for each converter 140, the error currents can be suppressed, to a minimal value at or near zero, within dominant harmonics within the power system 100. A selective current controller 300, seen in FIG. 3, may be used to suppress the cross currents (error currents).

The controller 300, is a proportional-integral-resonant (PIR) control containing a proportional control 310, an integral control 320, and a plurality of resonant controls 330, one resonant control 330 within each dominant harmonic (e.g., $1^{st}$, $3^{rd}$, $5^{th}$, $h^{th}$ harmonics).

The proportional control 310 uses the calculated cross currents as the error, which the controller 300 reduces to zero in steady state, resulting in balanced currents within each treads 110, 120, 130.

The integral control 320 ensures the direct current (DC) component within the cross current is reduced to a value at or near zero in steady sate. Reduction of the cross current can be expanded to other harmonics if the integral control 320 is shifted in a frequency domain and centered at a targeted frequency, e.g., 1, 3, or $h^{th}$ harmonic.

Shifting the target frequency of the integral control 320 can form the resonant control 330, which has infinite gain at the target frequency. The resonant control 330 ensures that a targeted spectral component is suppressed in steady state. At a high resonant control 330, gain is localized only around a central resonant frequency, which can be achieved while maintaining stability a PIR control loop. As seen in FIG. 3, a plurality of integral controls 320 can serve as one or more of the resonator controllers 330 when the integral controls 320 are centered at zero frequency. The plurality of resonant controls 330 allows the controller 300 to target several dominant harmonic (e.g., 0, 1, 3, . . . , $h^{th}$) components to suppress those harmonics in steady sate.

The sequence shown in FIG. 3, provides the frequency shift of the integral control 320 placed between a demodulator stage 340 and a modulator stage 350. The modulation and demodulation are performed by orthogonal signals sin/cos generated using an angle θ of the converter 140 cumulative mode control reference frame. In this way, the resonant controls 330 can be centered at output frequency ($\omega_0$) of the converter 140 and the output frequency harmonics.

Gains from the proportional control 310 ($K_P$) and gains from the integral control 320 ($K_I$) can be parameterized in several ways, for example using an output frequency bandwidth ($\omega_{BW}$) and relative damping (ζ) of the PIR control loop. Proportional control gains and integral controls gains are respectively defined as:

$$K_P = L_{scale} \times 2\zeta\omega_{BW}; \text{ and}$$

$$K_I = L_{scale} \times \omega_{BW}^2,$$

where $L_{scale}$, is a scaled inductance determined based on whether the common mode current or the differential mode current is regulated.

The total gains ($G_c$) of the controller 300 in a Laplace's transformation (e.g., frequency-domain or s-domain) is defined as, $$G_c(s) = K_P + K_I + \sum_{k=0,1,3,\ldots,h} \frac{s}{s^2 + (i_\omega 0)^2}$$

The controller 300 may contain one or more of the following components (not shown in detail): (i) a core, including a microcontroller, microprocessor, programmable logic controller (PLC), complex programmable logic device (CPLD), field-programmable gate array (FPGA), or the like; (ii) a memory for storing and accessing data such as static random access memory, electrically erasable programmable read only memory, or the like; (iii) inputs for power delivery and analog/digital information; (iv) outputs for drivers or logic; and (v) communication links to allow devices (or their microcontrollers) to communicate with one another without a host computer system, for example, local area network (LAN), a metropolitan area network (MAN), or a wide area network (WAN).

It should be understood that while the description refers to computer-readable instructions, embodiments of the present disclosure can also be implemented in combination with other program modules and/or as a combination of hardware and software in addition to, or instead of, computer readable instructions.

It is contemplated that the controller 300 can include features in addition to or in place of the resonant controls 330. For example, one or more resonant controls 330 may be transformed from frequency domain (s-domain) resonant controls to z-domain resonant controls transfer functions in form of a second order impulse invariant response (IIR) filter.

In some embodiments, where an integral control 320 is present within the control loop, the controller 300 may execute a voltage limitation sequence 400 using anti-winding up protection as seen in FIG. 4.

During transients due to their inherent integral action, the integral control 320 and resonant controls 330 may force the voltage reference into voltage limitation, which can cause integration winding-up (or wind-up) of the controller 300 and deteriorated dynamic response of the controller 300. Where only one resonant control 330 exist, wind-up can be regulated by introducing limits onto the output of the integral control 320.

However, introducing limits onto the integral control 320 outputs is suboptimal when multiple resonant controls 330 exist within the controller 300 because fractions of the total voltage margin need to be arbitrarily distributed to particular integrators without knowing the actual voltage levels, which are typically required to suppress particular spectral components. For example, when a resonator integral (RI) output reaches a pre-set local limit, incomplete current harmonic compensation occurs while the total voltage is within the available voltage margin.

As seen in FIG. 4, the voltage limitation sequence 400 creates a single point of limitation 405, located at an output of a composite controller, to optimally utilize the voltage margin available for the converter local voltage reference trimming. The voltage limitation sequence 400 consists of (i) calculating a non-delivered voltage due to saturation, (ii) calculating a limiting feedback current signal for correction of a reference current, through a voltage limiter 410, produced with the non-delivered voltages if the limitation was not present, and (iii) correcting of the cross current references by the limiting current.

Once the output of the controller 300 reaches levels above the pre-set local limit, the output is saturated. To calculate the non-delivered voltage, it is necessary to determine whether the power system 100 modulation is performed using a carrier based modulation or space vector modulation. The voltage differences for modulation can be expressed in the a,b,c phase or $0,\alpha,\beta$ domain. For example, if voltage references are expressed in the phase domain and then limited ($V_{Lim}$), the non-delivered voltages (e.g., voltage losses) due to saturation are:

$\Delta v_{Ref}a^{(i)} = V_{Lim} - v_{Ref}a^{(i)}$, if $|v_{Ref}a^{(i)}| > V_{Lim}$ else $\Delta v_{Ref}a^{(i)} = 0$;

$\Delta v_{Ref}b^{(i)} = V_{Lim} - v_{Ref}b^{(i)}$, if $|v_{Ref}b^{(i)}| > V_{Lim}$ else $\Delta v_{Ref}b^{(i)} = 0$; and $\Delta v_{Ref}c^{(i)} = V_{Lim} - v_{Ref}c^{(i)}$, if $|v_{Ref}c^{(i)}| > V_{Lim}$ else $\Delta v_{Ref}c^{(i)} = 0$.

From the grid 180/plant 190 models of the current loops, the resulting current which would be produced by the non-delivered voltages are calculated and fed back to modify the references at inputs of the controller 300. For example, if control of the cross current is performed by the controller 300 in the $0,\alpha,\beta$ domain, the voltage differences are transferred into the $0,\alpha,\beta$ domain ($\Delta V_{Ref0}^{(i)}$, $\Delta V_{Ref\alpha}^{(i)}$, $\Delta V_{Ref\beta}^{(i)}$) and then the corresponding currents are calculated as:

$$\frac{d}{dt}i_{Ref0}^{(i)} = \frac{1}{L_0}\left(\Delta v_{Ref0}^{(i)} - R_0 i_{Ref0}^{(i)}\right),$$

$$\frac{d}{dt}i_{Ref\alpha}^{(i)} = \frac{1}{L}\left(\Delta v_{Ref\alpha}^{(i)} - R i_{Ref\alpha}^{(i)}\right), \text{ and}$$

$$\frac{d}{dt}i_{Ref\beta}^{(i)} = \frac{1}{L}\left(\Delta v_{Ref\beta}^{(i)} - R i_{Ref\beta}^{(i)}\right).$$

$d/dt i_{Ref}\alpha^{(i)} = 1/L(\Delta v_{Ref}\alpha^{(i)} - R i_{Ref}\alpha^{(i)})$, and $d/dt i_{Ref}\beta^{(i)} = 1/L(\Delta v_{Ref}\beta^{(i)} - R i_{Ref}\beta^{(i)})$.

If control of the cross current is performed in the phase domain similar, calculations can be performed using the phase a,b,c voltage differences.

As the result of the anti-winding up feedback and modification of the current references, from the controller point of view, effect of the voltage limitation will not be visible as the feedback and modified reference currents return exactly what the feedback signal would return if the voltage limitation were not present. Once the controller output is found within the voltage limit, the full compensation at the targeted harmonics will be restored as the current reference modifications will decay to zero.

After processing by the voltage limiter 410, the voltage references of the cross currents are added to the references coming from the reference coming from the control of the cumulative current.

It is to be appreciated that the Detailed Description section and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

We claim:

1. A method for regulating cross-current flow within a power converter system comprising:
   measuring, by a controller comprising a proportional control, an integral control, and at least one resonator control, an existing amount of cross current within each of a plurality of converters within the power converter system;
   summing, by the controller, the existing amount of cross current within each of a plurality of converters to create a summed cross current;
   applying, by the controller, a selective current control within the plurality of converters to suppress a common mode component, a first differential mode component, and a second differential mode component within the summed crossed current;
   calculating, within one of the plurality of converters, the common mode component of the summed cross current formed by summing a current first current from a first phase of a converter, a second current from a second phase of the converter, and a third current from a third phase of the converter; and wherein
   the common mode component within each of a plurality of dominant harmonics within the one of the plurality of converters is suppressed to a value approximately near zero using the controller.

2. The method of claim 1 further comprising:
   calculating, for the power system, the first differential component of the summed cross current formed by summing the first differential component of each of the plurality of converters; and
   calculating, for the power system, the second differential component of the summed cross current formed by summing the first differential component of each of the plurality of converters.

3. The method of claim 2 wherein the first differential component within each of a plurality of dominant harmonics within the one of the plurality of converters is suppressed to a value approximately near zero using the controller.

4. The method of claim 2 wherein the second differential component within each of a plurality of dominant harmonics within the one of the plurality of converters is suppressed to a value approximately near zero using the controller.

5. The method of claim 1 further comprising:
   deriving, by the controller, an initial voltage reference from one of the plurality of converters;
   performing, by the controller, a voltage limitation determined by a calculation of voltage not delivered by the converter system due to saturation;
   calculating, by the controller, a loss of current corresponding to the calculated voltage not delivered by the converter system due to saturation; and
   adjusting, by the controller, the existing amount of cross current by the amount of the loss of current.

6. The method of 5, further comprising:
   adding, by the controller, to the initial voltage reference, a deliverable voltage reference derived from a cross current to the initial voltage reference.

7. A method for regulating cross-current flow within a paralleled converter system comprising:
   calculating, by a controller comprising a proportional control, an integral control, and at least one resonator control, an existing amount of cross current within each of a plurality of converters within the power converter system;
   summing, by the controller, the existing amount of cross current within each of a plurality of converters to identify a common mode component of the cross current, a first differential mode component of the cross current, and a second differential mode component of the cross current, creating a summed cross current; and
   applying, by the controller, a selective current control within the plurality of converters to suppress the common mode component of the cross current, the first differential mode current of the cross current, and the second differential mode current of the cross current within the summed crossed current;
   calculating, within the one of the plurality of converters, the first phase mode current of the converter by (i) summing the first phase mode current within each of the plurality of converters to generate a summed first phase mode current, (ii) dividing the summed first phase mode current by an integer of the number of the plurality of converters to form a divided first phase mode current, and (iii) subtracting the divided first phase mode current from the first phase mode current of one of the polarity of converters; and
   suppressing, by the controller, the first phase mode current within each of a plurality of dominant harmonics within the one of the plurality of converters is suppressed to a value approximately near zero.

8. The method of claim 7 further comprising:
   calculating, within the one of the plurality of converters, the second phase mode current of the converter by (i) summing the second phase mode current within each of the plurality of converters to generate a summed second phase mode current, (ii) dividing the summed second phase mode current by an integer of the number of the plurality of converters to form a divided second phase mode current, and (iii) subtracting the divided second phase mode current from the second phase mode current of one of the polarity of converters; and
   suppressing, by the controller, the second phase mode current within each of a plurality of dominant harmonics within the one of the plurality of converters is suppressed to a value approximately near zero.

9. The method of claim 7 further comprising:
   calculating, within the one of the plurality of converters, the third phase mode current of the converter by (i) summing the third phase mode current within each of the plurality of converters to generate a summed third phase mode current, (ii) dividing the summed third phase mode current by an integer of the number of the plurality of converters to form a divided third phase mode current, and (iii) subtracting the divided third phase mode current from the third phase mode current of one of the polarity of converters; and
   suppressing, by the converter, the third phase mode current within each of a plurality of dominant harmonics within the one of the plurality of converters is suppressed to a value approximately near zero using the controller.

10. The method of claim 7 further comprising:
    deriving, by the controller, an initial voltage from one of the plurality of converter;
    calculating, by the controller, a voltage limitation determined by a calculation of voltage not delivered to the converter system due to saturation;

calculating, by the controller, a loss of current corresponding to the calculation of voltage; and adjusting, by the controller, the existing amount of cross current by the amount of the loss of current.

11. The method according to claim 10, further comprising:

adding, by the controller, to the initial voltage the calculation of voltage.

12. A computer-readable device comprising instructions, that, when executed by a processor, cause the processor to perform operations, regulating cross current within a power system, comprising:

measuring, by the device, an existing amount of cross current within each of a plurality of converters within the power converter system;

summing, by a controller, the existing amount of cross current within each of a plurality of converters to create a summed cross current;

applying, by the controller, a selective current control within the plurality of converters to suppress a common mode current, a first differential mode current, and a second differential mode current within the summed crossed current, calculating, within one of the plurality of converters, the common mode component of the summed cross current formed by summing a current first current from a first phase of a converter, a second current from a second phase of the converter, and a third current from a third phase of the converter; and suppressing, by the device, the common mode component within each of a plurality of dominant harmonics within the one of the plurality of converters is suppressed to a value approximately near zero using the controller wherein the device comprises a proportional control, an integral control, and at least one resonator control.

13. The system of claim 12 further comprising:

calculating, for the power system, the first differential component of the summed cross current formed by extraction of the common mode component from the summed cross current; and suppressing the first differential component within each of a plurality of dominant harmonics within the one of the plurality of converters is suppressed to a value approximately near zero using the controller.

14. The system of claim 12 further comprising:

calculating, for the power system, the second differential component of the summed cross current formed by extraction of the common mode component from the summed cross current; and suppressing the second differential component within each of a plurality of dominant harmonics within the one of the plurality of converters is suppressed to a value approximately near zero using the controller.

15. The system of claim 12 further comprising:

deriving, by the controller, an initial voltage from one of the plurality of converter;

calculating, by the controller, a voltage limitation determined by a calculation of voltage not delivered to the converter system due to saturation;

calculating, by the controller, a loss of current corresponding to the calculation of voltage; and adjusting, by the controller, the cross current by the amount of the loss of current.

16. The system of 15 further comprising:

adding, by the controller, to the initial voltage the measurement of voltage.

* * * * *